United States Patent
Walsh et al.

(10) Patent No.: US 9,743,658 B1
(45) Date of Patent: *Aug. 29, 2017

(54) INTERNAL BALLASTED RODENT BAIT STATION

(71) Applicant: Bell Laboratories, Inc., Madison, WI (US)

(72) Inventors: James R. Walsh, Wauwatosa, WI (US); Daniel C. Johnson, Madison, WI (US)

(73) Assignee: Bell Laboratories, Inc., Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/368,387

(22) Filed: Dec. 2, 2016

Related U.S. Application Data (63) Continuation of application No. 14/310,046, filed on Jun. 20, 2014, now Pat. No. 9,538,741, which is a continuation of application No. 13/052,249, filed on Mar. 21, 2011, now Pat. No. 8,793,929.

(51) Int. Cl.
| | |
|---|---|
| *A01M 25/00* | (2006.01) |
| *A01M 23/00* | (2006.01) |
| *F16M 11/10* | (2006.01) |
| *B65D 55/02* | (2006.01) |
| *B65D 43/16* | (2006.01) |
| *A01M 23/30* | (2006.01) |

(52) U.S. Cl.
CPC .......... *A01M 25/004* (2013.01); *A01M 23/00* (2013.01); *A01M 23/30* (2013.01); *B65D 43/16* (2013.01); *B65D 55/02* (2013.01); *F16M 11/10* (2013.01); *F16M 2200/041* (2013.01)

(58) Field of Classification Search
CPC .. A01M 25/00; A01M 25/002; A01M 25/004; A01M 23/00; A01M 23/005; A01M 23/24; A01M 23/30
USPC ....................................... 43/131, 58, 114, 81
See application file for complete search history.

(56) References Cited

U.S. PATENT DOCUMENTS 3,343,744 A * 9/1967 Morell ................. B65D 5/5021
229/122
3,488,879 A * 1/1970 Laughlin ............. A01M 25/004
43/131

(Continued)

FOREIGN PATENT DOCUMENTS

| DE | 3140658 A1 * | 4/1983 | .......... A01M 25/004 |
| EP | 1201124 A2 | 5/2002 | |

(Continued)

OTHER PUBLICATIONS

Web page: "Essex Pest Control" downloaded Jan. 17, 2011, pp. 1-6.

*Primary Examiner* — Darren W Ark
(74) *Attorney, Agent, or Firm* — Stiennon & Stiennon (57) ABSTRACT

A rodent bait station has a base with a hinged cover which is lockable to the base to define an interior volume which receives a ballast weight of three to twenty-four pounds which biases a floor of the base against a support surface. At least one rodent access opening in the bait station allows a rodent to pass in to the interior volume. A bait or a rodent trap is positioned within the interior volume such that a rodent can move freely within the interior volume so as to access the bait or rodent trap.

9 Claims, 5 Drawing Sheets

(56) References Cited

U.S. PATENT DOCUMENTS

| | | | |
|---|---|---|---|
| 3,821,861 A * | 7/1974 | Jalbert | A01K 69/08 43/100 |
| 3,992,804 A * | 11/1976 | Senese | A01K 69/08 43/100 |
| 4,026,064 A * | 5/1977 | Baker | A01M 25/004 43/131 |
| 4,208,829 A * | 6/1980 | Manning | A01M 25/004 43/131 |
| 4,261,132 A * | 4/1981 | Carothers | A01M 25/004 43/131 |
| 4,486,973 A * | 12/1984 | Faucillon | A01K 69/08 43/100 |
| 4,541,198 A * | 9/1985 | Sherman | A01M 25/004 43/131 |
| 4,648,201 A * | 3/1987 | Sherman | A01M 25/004 43/131 |
| 4,730,412 A * | 3/1988 | Sherman | A01M 25/004 43/131 |
| 5,040,327 A * | 8/1991 | Stack | A01M 25/004 220/281 |
| 5,184,415 A | 2/1993 | Hattenbach et al. | |
| 5,272,832 A * | 12/1993 | Marshall | A01M 25/004 220/326 |
| 5,657,575 A * | 8/1997 | Miller | A01M 25/008 43/121 |
| 5,806,237 A * | 9/1998 | Nelson | A01M 25/004 43/131 |
| 5,943,817 A * | 8/1999 | Miller | A01M 1/2011 43/131 |
| 5,966,863 A * | 10/1999 | Payton | A01M 1/2011 43/131 |
| 6,145,242 A * | 11/2000 | Simpson | A01M 1/2011 43/131 |
| 6,164,010 A * | 12/2000 | Snell | A01M 1/026 43/114 |
| 6,266,917 B1 * | 7/2001 | Hight | A01M 1/103 43/114 |
| 6,370,813 B1 * | 4/2002 | Nelson | A01M 1/005 43/121 |
| 6,378,243 B1 * | 4/2002 | Snell | A01M 1/026 43/131 |
| 6,379,243 B1 | 4/2002 | Snell et al. | |
| 6,397,517 B1 * | 6/2002 | Leyerle | A01M 23/24 43/131 |
| 6,474,016 B2 * | 11/2002 | Snell | A01M 1/026 43/131 |
| 6,493,988 B1 * | 12/2002 | Johnson | A01M 25/004 43 |
| 6,497,070 B1 * | 12/2002 | Snell | A01M 1/026 43/131 |
| 6,513,283 B1 * | 2/2003 | Crossen | A01M 25/004 43/131 |
| 6,618,983 B1 * | 9/2003 | Spragins | A01M 1/14 43/107 |
| 6,651,378 B2 * | 11/2003 | Baker | A01M 1/2005 43/121 |
| 6,671,999 B1 * | 1/2004 | Doucette | A01M 1/2011 43/131 |
| 6,874,274 B2 * | 4/2005 | Townsend | A01M 25/004 43/107 |
| D551,735 S * | 9/2007 | Bartlett | D22/121 |
| 7,735,258 B2 * | 6/2010 | Vickery | A01M 1/2011 220/603 |
| 7,874,098 B2 * | 1/2011 | Vickery | A01M 25/004 43/131 |
| 7,980,023 B2 * | 7/2011 | Nelson | A01M 25/004 43/114 |
| 8,028,468 B1 * | 10/2011 | Walsh | A01M 25/004 43/124 |
| 8,209,900 B2 * | 7/2012 | Vickery | A01M 25/004 43/131 |
| 8,291,637 B2 * | 10/2012 | Patterson | A01M 23/30 43/81 |
| 8,302,345 B2 * | 11/2012 | Nelson | A01M 25/004 43/114 |
| 8,387,304 B2 * | 3/2013 | Cink | A01M 25/004 43/131 |
| 8,387,305 B2 * | 3/2013 | Cink | A01M 25/004 43/131 |
| 8,578,649 B1 * | 11/2013 | Walsh | A01M 25/004 220/603 |
| 8,793,929 B1 * | 8/2014 | Walsh | A01M 23/30 43/131 |
| 8,984,801 B2 * | 3/2015 | Vickery | A01M 1/2011 220/603 |
| 9,155,294 B2 * | 10/2015 | Vickery | A01M 1/2011 |
| 9,532,564 B1 * | 1/2017 | Walsh | A01M 25/004 |
| 9,538,741 B1 * | 1/2017 | Walsh | A01M 23/30 |
| 2004/0244274 A1 * | 12/2004 | Dellevigne | A01M 25/004 43/131 |
| 2005/0028431 A1 * | 2/2005 | Hoyes | A01M 25/004 43/131 |
| 2005/0102887 A1 * | 5/2005 | Lang | A01M 23/04 43/64 |
| 2006/0053682 A1 * | 3/2006 | Goldstein | A01M 23/005 43/67 |
| 2006/0117644 A1 * | 6/2006 | Hoyes | A01M 25/004 43/131 |
| 2008/0072475 A1 | 3/2008 | Nelson et al. | |
| 2009/0056199 A1 * | 3/2009 | Reed | B29C 65/48 43/131 |
| 2009/0229170 A1 * | 9/2009 | Gaibotti | A01M 25/004 43/131 |
| 2009/0307963 A1 * | 12/2009 | Abbas | A01M 25/004 43/131 |
| 2010/0050498 A1 * | 3/2010 | Nelson | A01M 25/004 43/60 |
| 2010/0251598 A1 | 10/2010 | Vickery | |
| 2010/0313466 A1 | 12/2010 | Vickery | |
| 2010/0325940 A1 * | 12/2010 | Pryor | A01M 25/004 43/131 |
| 2011/0226921 A1 * | 9/2011 | Patterson | A01M 25/004 248/346.03 |
| 2012/0036763 A1 * | 2/2012 | Kay | A01M 25/004 43/131 |
| 2012/0102821 A1 * | 5/2012 | Jovic | A01M 25/004 43/131 |
| 2012/0124891 A1 * | 5/2012 | Jovic | A01M 25/004 43/131 |
| 2012/0311918 A1 * | 12/2012 | Kay | A01M 25/004 43/61 |
| 2013/0118056 A1 * | 5/2013 | Covington | A01M 25/004 43/131 |

FOREIGN PATENT DOCUMENTS

| | | | | |
|---|---|---|---|---|
| EP | 2100504 A2 | | 9/2009 | |
| FR | 2564287 A1 | * | 11/1985 | A01M 25/004 |
| GB | 2023987 A | | 1/1980 | |
| GB | 2096446 A | * | 10/1982 | A01M 25/004 |
| GB | 2241145 A | * | 8/1991 | A01M 25/004 |
| GB | 2249249 A | * | 5/1992 | A01M 25/004 |
| GB | 2333437 A | * | 7/1999 | A01M 25/004 |
| GB | WO 2004098281 A1 | * | 11/2004 | A01M 25/004 |
| IT | WO 9963812 A1 | * | 12/1999 | A01M 23/04 |
| IT | EP 1201124 A2 | * | 5/2002 | A01M 1/2011 |
| IT | EP 2100504 A2 | * | 9/2009 | A01M 25/004 |
| WO | 8203968 A1 | | 11/1982 | |
| WO | WO 8203968 A1 | * | 11/1982 | A01M 25/004 |
| WO | 9963812 A1 | | 12/1999 | |
| WO | 2004098281 A1 | | 11/2004 | |

* cited by examiner

INTERNAL BALLASTED RODENT BAIT STATION

CROSS REFERENCES TO RELATED APPLICATIONS

This application is continuation application of U.S. application Ser. No. 14/310,046, filed Jun. 20, 2014 and claims priority from U.S. application Ser. No. 13/052,249, filed Mar. 21, 2011, and issued as U.S. Pat. No. 8,793,929 on Aug. 5, 2014, the disclosures of which are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to bait stations containing rodenticide bait or traps in general and to bait stations in combination with a ballast weight in particular.

Bait stations serve two general purposes, the first is to shield the bait or traps from non-target species and people, particularly children, and the second is to facilitate monitoring rodent presence in a particular area, by preventing targeted rodents from removing the bait. The bait station generally consists of a lockable plastic or metal container in which bait or traps are placed. If bait is used, it is often in the form of bait blocks, which are formed of grain mixed with paraffin and rodenticide. The bait blocks are cast or extruded and their use facilitates retaining the bait within the bait station to prevent the targeted rodents from scattering the bait.

To prevent movement of the bait station by a targeted or non-targeted species, a bait station is often screwed or nailed to the floor or other structure. This approach has its limitations. Using fasteners to attach the station may damage the building floor. Moreover, when the bait station is screwed down it is difficult to clean (typically done by inverting it), and the approach is less easily done where the floor is concrete or the like, or where the bait station is outdoors where a ground anchor is necessary. In these situation, instead of attaching the bait station to a fixed object the bait station may be attached to a ballast weight. Any substantial weight attached to the bait station prevents the targeted species from easily removing the bait or traps from their initial position and generally reduces the interest of pets and even children in playing with the bait station, because the added weight means it takes more effort to move or manipulate the bait station. Attachment of weight to a bait station generally requires an additional structure mounted beneath the bait station.

SUMMARY OF THE INVENTION

The bait station of this invention comprises a bait station base connected by an integral hinge to a cover. Closing the cover against the base locks it to the base. The bait station cover and base define an interior volume, in which is placed rodenticide bait or rodent traps. The base has portions forming a floor and an upwardly extending side wall which defines two rodent access openings. The cover likewise has portions defining an upper wall and downwardly depending side walls which engage the upwardly extending side walls of the base. Placed within the base is a ballast weight of approximately 7.5 to 8.5 pounds with a specific gravity of about 2.3, typically of brick or concrete, with a volume of about 85 cubic inches. Placed on top of the ballast weight is a tray which supports rodent traps or a plurality of bait blocks mounted to the tray or between the tray and the upper wall of the cover. Portions of the bait station base form ramps which extend upwardly from the floor of the base adjacent the rodent opening. The ramps extend upwardly to a landing formed as an extension of the tray, wherein the ballast extends between the ramps and below the landing. The landing leads to the rodent trap or the bait contained on the tray proper.

From the landing an entryway into the tray proper is defined between baffles extending downward from the cover and portions of the tray which extend upwardly. The upwardly extending portions of the tray and the downwardly extending portions of the tray directly engage so that when the cover, to which the downward extending portions are integral, is closed, the cover clamps the tray in place and prevents movement of the underlying ballast weight. Smaller downwardly extending flanges which extend outwardly of the cover side walls engage portions of the tray landing and similar downwardly extending flanges engage portions of the tray opposite the landing and adjacent to the cover side wall, to prevent movement of the tray and thus movement of the underlying ballast weight during shipping.

It is an object of the present invention provide a bait station with an internal 5 ballast.

It is another object of the present invention to provide a bait station which can easily be cleaned out.

It is a further object of the present invention to provide a bait station which prevents an internal ballast weight from shifting.

It is yet a further object of the present invention to provide a bait station which can be locked with a key, or can be converted to a fixed latch operator arrangement.

Other advantages of the invention will be apparent from the following detailed description when taken in conjunction with the accompanying drawings.

DESCRIPTION OF THE PREFERRED EMBODIMENTS

Figure 1:
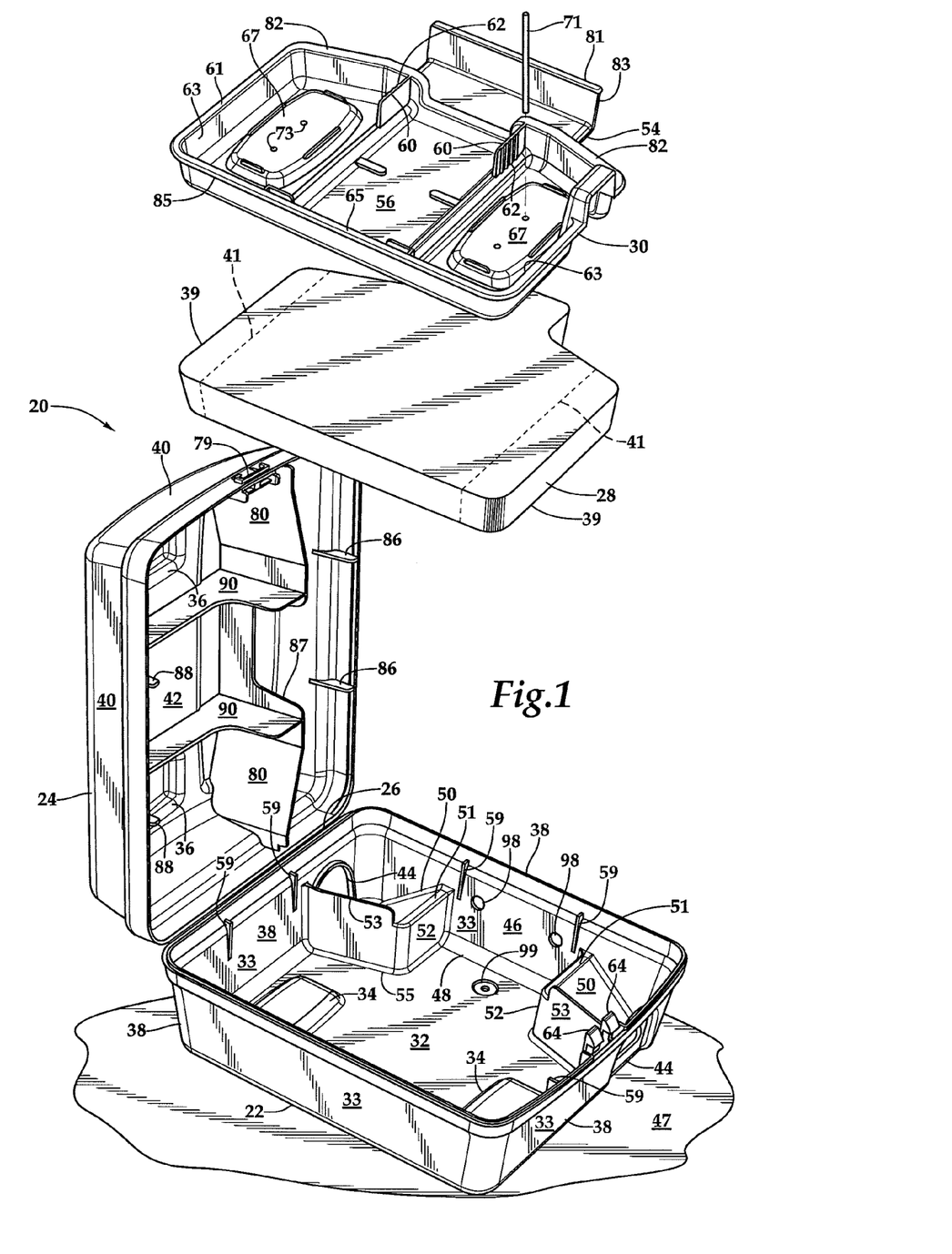
FIG. 1 is an exploded isometric top view of the bait station of this invention.
Figure 2:
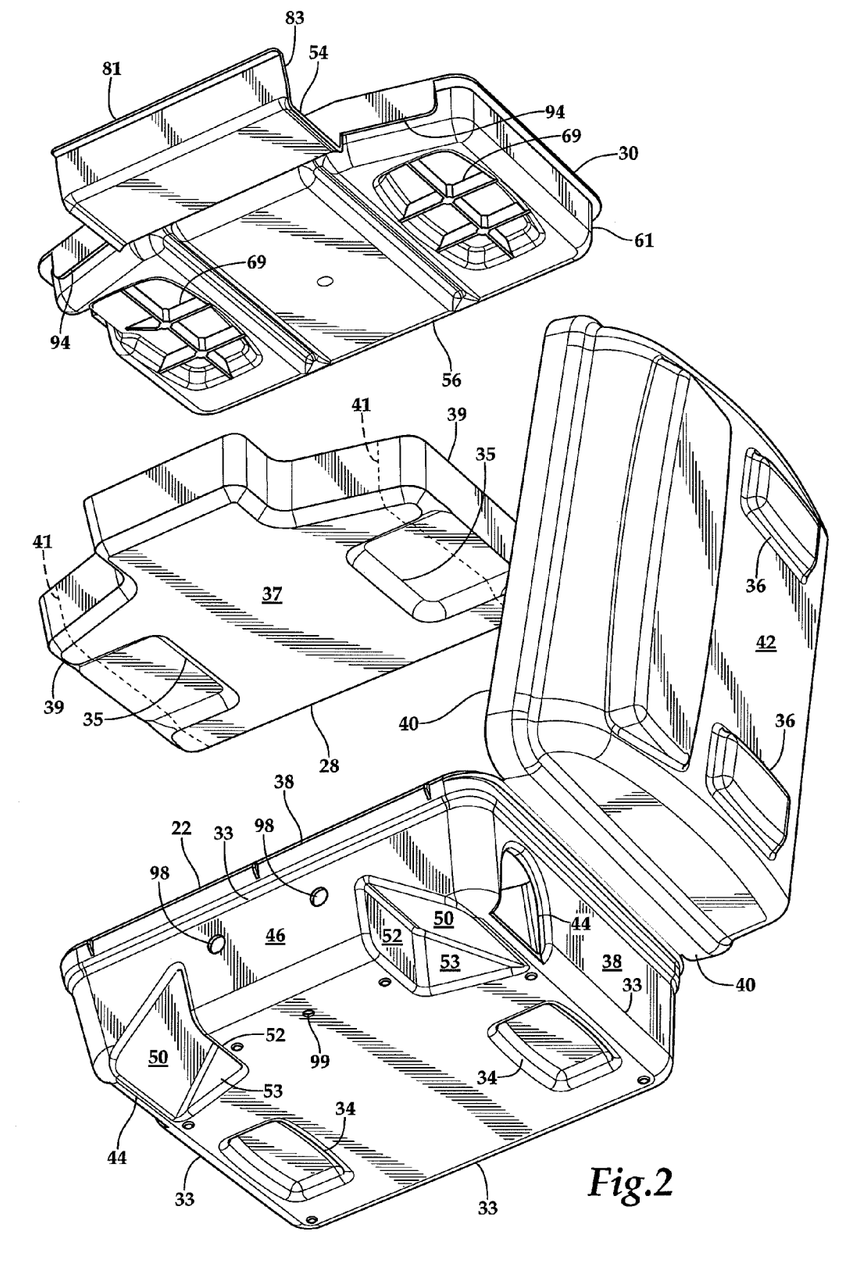
FIG. 2 is an exploded isometric bottom view of the bait station of FIG. 1.

Referring more particularly to FIGS. 1-11, wherein like numbers refer to similar parts, a bait station 20 is shown in FIGS. 1-4. As shown in FIG. 1, the bait station 20 has a base 22 and a cover 24 joined by an integral hinge 26. The cover is arranged to close over the base and together with the base defines an interior volume. The base 22, cover 24, and hinge 26 may be formed as an integral injection molded part. The base 22 has portions defining a ballast containment space 55. A ballast weight 28 weighing approximately 7 to 14 pounds is placed in the base 22 within the containment space. The volume of the ballast weight is about 25-200 cubic inches. A molded tray 30 is disposed on top of the ballast weight. The bait station 20 base 22 has a floor 32 which is generally flat but has two inwardly projecting nesting ridges 34 which allow a plurality of bait stations 20 to be stacked, such that the ridges 34 engage with corresponding outwardly projecting cover ridges 36 on the cover 24 of a similar stacked bait station. The two nesting ridges 34 also engage corresponding indentations 35 in the bottom surface 37 of the ballast weight 38 which are shown in FIG. 2. The inter-engagement of the nesting ridges 34 and the indentations 35 in the ballast weight 38 allow various sizes of ballast weight to be used in the same bait station so if desired. Smaller ballast weights may be manufactured which retain this inter-engagement with the base indentations. A smaller ballast weight having shorter the sides 39 as indicated by the dashed lines 41 in FIG. 2 can be used because the inter-engagement restricts side to side motion of the ballast weight 38 by the interaction of the two nesting ridges 34 and corresponding indentations 35 in the bottom surface 37 of the ballast weight 38.

The base 22 has a peripheral wall 38 of four segments 33 forming a rectangle which surrounds the floor 32. The base wall 38 extends upwardly to engage a corresponding cover peripheral wall 40 which extends downwardly from a cover 24 upper wall 42. The peripheral wall 38 of the base 22 meets the cover 24 downwardly depending wall 40 along a labyrinth seal 43, shown in FIG. 3, which resists penetration of an object between the base and the cover.

Figure 3:
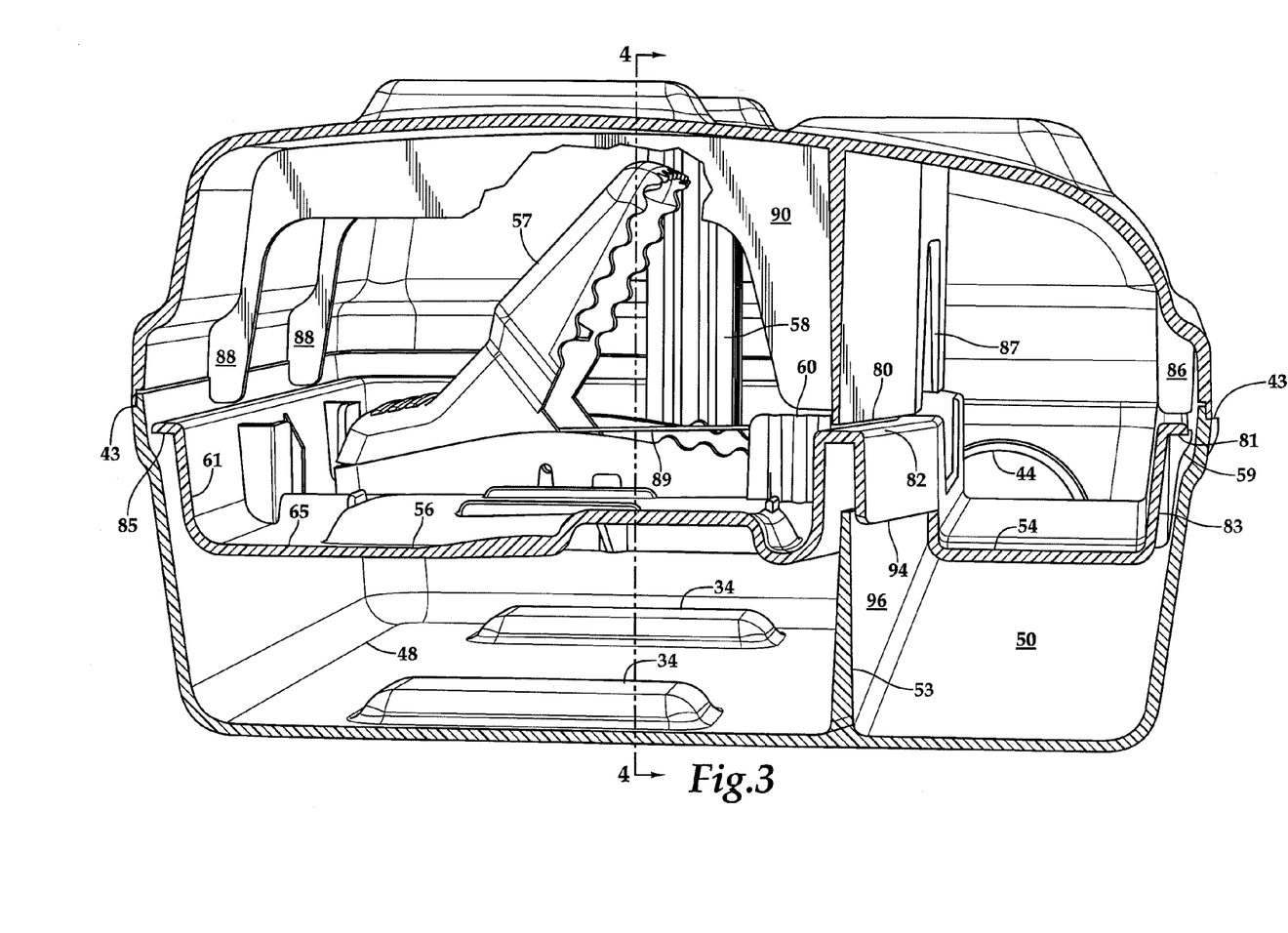
FIG. 3 is a cross-sectional view of the assembled bait station of FIG. 4 taken long section line 3-3.

As shown in FIG. 1, portions of the base peripheral wall 38 define rodent access openings 44 which are opposed to each other along a first segment 46 of the base peripheral wall 38. The rodent access openings 44 preferably open at or just above the floor 32 of the base 22 so that a rodent moving over the ground or surface 47 which supports the base 22 of the bait station 20 can readily enter. The peripheral wall 38 and the floor 32 define a base interior 48. As shown in FIGS. 1 and 3, portions of the floor 32 are arranged to form upwardly extending ramps 50 which begin just inside the openings 44 and extend upwardly substantially to or slightly above the height of the ballast weight 28. Ramp side walls 53 separate the rodent access paths defined along the ramps 50 from the ballast containment space 55 in the base 22. The ballast weight 28 can substantially fill the base interior 48 including about ¾ of the portion of the base which is between the ramps 50 to a depth of about 1¼ inches, depending on total ballast weight volume. The ramps 50 extend upwardly between the first side 46 and short interior walls 52 which extend upwardly slightly above a level defined by the ballast weight 28.

Figure 4:
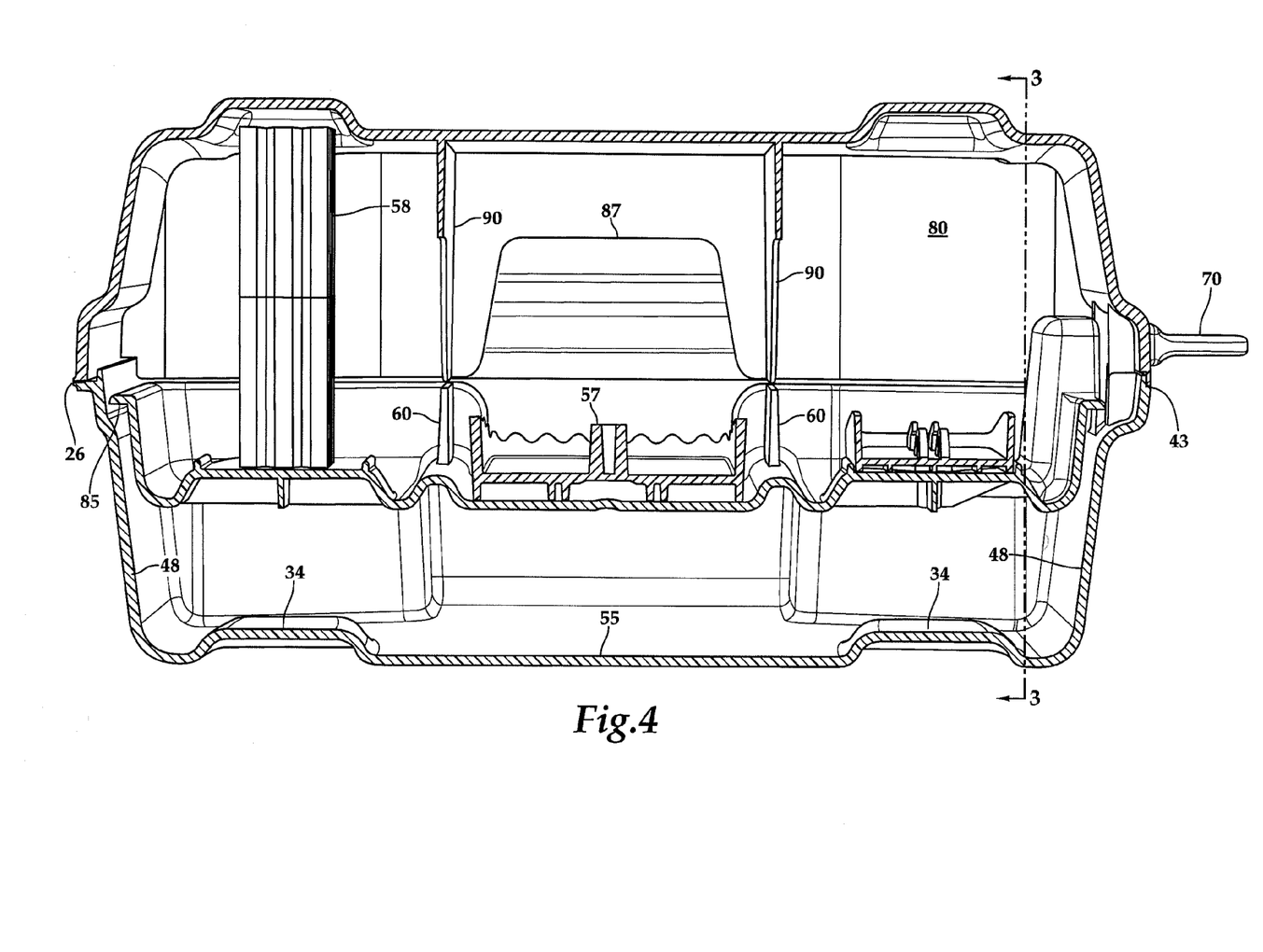
FIG. 4 is a cross-sectional view of the assembled bait station of FIG. 3 taken long section lines 4-4.

As shown in FIG. 1, the tray 30 has two parts, a landing 54 which extends between the ramps, and a tray proper 56 which receives rodent traps 57 or bait blocks 58 as shown in FIGS. 3 and 4. The tray 30 has a generally raised edge 61 to contain feeding debris from the bait blocks 58, and is generally divided into two outer stations 63 designed to support bait blocks or rodent traps, and one central station 65 configured to hold a rodent trap 57. The outer stations have raised platforms 67 which provide space for structural grids 69 underlying the platforms. The structural grids 69 provide support for rods 71 which extend into rod pockets 73 which extend into the grids. As shown in FIG. 1, the tray 30 rests on the tops 51 of the ramps 50 and on eight tabs 59 arranged along the base side wall 38. The tray thus need not be supported by the ballast weight 28 over which it extends. Two tabs 59 extend outwardly of each wall segment 33 to support the tray 30 in its proper position with respect to the base 22 and the ramps 50, even if the bait station is used without the ballast weight 28.

The tray 30 has two short tray walls 60 which extend upwardly from the tray proper 56. The short tray walls 60 are preferably formed with vertical ribs 62 which provide frictional gripping surfaces when engaged between a user's thumb and first two fingers. When the bait station cover 24 is open, the tray 30 may easily be removed by gripping the two short tray walls 60, one in each hand, and extracting the tray vertically. When the tray 30 is removed it may easily be inverted for cleaning to dispose of loose material which is accumulated on the upper surface of the tray.

Figure 5:
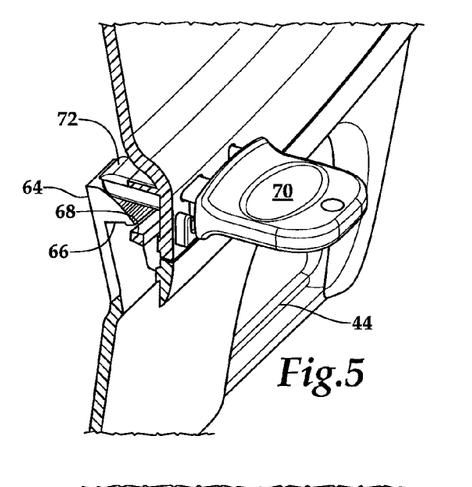
FIG. 5 is a cutaway partial isometric view of the bait station of FIG. 1 with a key inserted in the lock formed between the cover and the base of the bait station.
Figure 7:
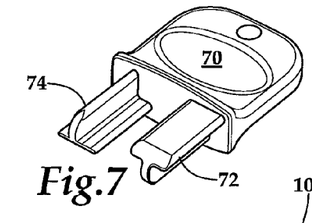
FIG. 7 is an isometric view of the key of the bait station shown in FIG. 5.
Figure 8:
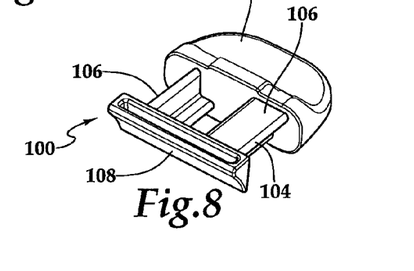
FIG. 8 is an isometric view of a device which converts a removable key for the bait station of FIG. 1 into a fixed latch operator arrangement.

As shown in FIG. 1, two resilient fingers 64 extend upwardly from the base. The fingers have hooks 66 arranged to engage a flange 68 on the cover when the bait station cover 24 is closed on the base, as shown in FIGS. 3 and 4. Thus closing the cover on the base causes the cover of the bait station to latch or lock to the base. The bait station is unlocked from the closed configuration by a key 70, best shown in FIG. 7. The key 70 has two prongs 72, 74 of differing cross section configured to pass through key hole openings 76, 78 in the cover 24 and to push against the resilient fingers 64, to thereby release the hooks 66 from the flange 68 and allow the bait station cover 24 to open, as shown in FIG. 5. The key 70 is arranged for simple one-handed operation of the lock and the cross sections of the prongs 72, 74 are mirror image such that the key can work in either of the two possible orientations. Once the key's two prongs 72, 74 are inserted through the base corresponding openings 76, 78 to unlock the cover 24, the key can remain in lock the cover is opened by using the key as a handle to lift the cover. A short U-shaped ledge 79 is positioned under the openings 76, 78 to aid in finding the openings and guiding the key into the openings. The design of the key and the keyhole openings can be easily customized with various shapes of constant cross-section, and matching corresponding keyholes, by simply forming a new key mold, and a new retractable mold piece to form the keyholes.

Figure 11:
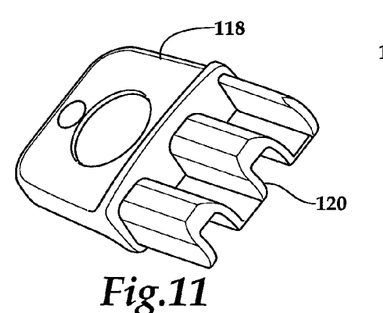
FIG. 11 is an isometric view of an alternative embodiment of the key of FIG. 5.

As shown in FIG. 11, an alternative embodiment key 118 has a single prong 120 which actuates both resilient fingers 64. The single prong 120 is preferably selected with symmetry such that the key can work in either of the two possible orientations.

When the cover 24 is locked to the base 22, the tray 30 is also locked against movement by pairs of flanges 86, 88, shown in FIG. 1, which extend downwardly and outwardly of the cover side wall 40 to engage the tray 30 against the tabs 59 as shown in FIG. 3. The flanges 86 engage a tray lip 81, shown in FIG. 1, which terminates a flange 83 which extends upwardly from the landing 54, best shown in FIGS. 2 and 3. The flanges 88 further engage a lip 85 which terminate the edge of the tray 30 opposite the landing 54, as best shown in FIGS. 1 and 3.

As shown in FIGS. 1 and 4, a baffle 80 extends downwardly from the cover 24. An opening 87 in the baffle 80 defines an entryway from the tray landing 54 to the tray proper 56. The opening 87 is arranged to force a rodents to pass over the trigger 89 of a rodent trap 57 as shown in FIG. 4.

Rodents may be additionally directed toward the rodent trap 57 by second baffles 90, as shown in FIGS. 1 and 3. The second baffles 90 extend all the way across the cover 24 as shown in FIG. 1 to strengthen the cover to support multiple weight containing bait stations when stacked for shipping. The second baffles 90 extend from the cover baffle 80 toward the rodent trap. The second baffles 90 extend downwardly from the cover upper wall 42 and are generally aligned with the short tray walls 60. The second baffled and the short tray walls, although not engaged, together guide rodents entering the opening 87 to pass over the trigger 89 of the rat trap 57. A suitable rodent trap is shown in U.S. Pat. No. 6,574,912, the disclosure of which is incorporated herein by reference.

As shown in FIG. 3, the cover baffle 80 has portions on ether side of the opening 87 which are closely spaced from the upwardly extending portions 82 of the tray 30. The upwardly extending portions 82 of the tray and the downwardly extending portions of the baffle 80 nearly engage so that when the cover 24 is closed on the base, the baffle 80 prevents substantial movement of the tray 30. When the cover is closed the ballast weight 28 is held between the tray 30 and the base 22 and prevents the ballast weight from substantial movement during shipping. The tray upwardly extending portions 82, as shown in FIG. 3, have downwardly depending lips 94 which overlap the insides 96 of the ramp side walls 53. Even the short depending lips 94 stiffen the tray 30, which need not extend to overlap the insides 96 of the ramp side walls 53. Portions of the first side 46 define holes 98 for tying the bait station 20 to a pipe or other fixed object. The base floor 32 has a hole 99 for screwing the base 22 to, for example, a building floor, obviate the need for the ballast weight in those situations.

Figure 6:
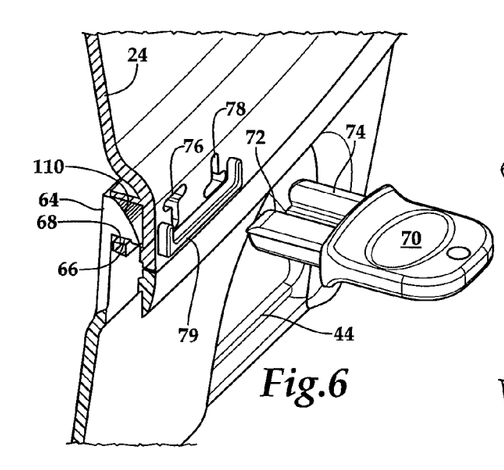
FIG. 6 is a cutaway partial isometric view of the arrangement of FIG. 5 with the key removed and the lock engaged.

FIGS. 7-10 show an alternative to the use of a key for opening the bait station to gain access to the bait station interior. In certain controlled settings where unauthorized personnel do not have access to the bait stations, such as within a poultry or pork operation the key-lock system shown in FIGS. 5-7 can be replaced with a fixed latch operator mechanism 100 without any modifications to the bait station 20.

Figure 9:
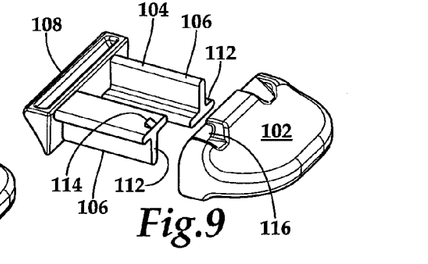
FIG. 9 is an exploded isometric view of the a device of FIG. 8

The latch operator mechanism 100 comprises a handle part 102 joined to a key part 104, as shown in FIG. 9. The key part has two prongs 106 joined by a transverse actuation bar 108. The two prongs 106 of the key part are installed in the bait station by sliding the prongs through the lock key holes 76 and 78 from the inside of the bait station 20 so that the actuation bar 108 is positioned in the space 110 between the hook 66 and the cover 24 shown in FIG. 6. The handle part 102 has pockets (not shown) which receive and retain the ends 112 of the key part prongs 106 which project from the cover. When the handle part is assembled to the key part 104, the latch operator mechanism 100 is formed. The latch operator mechanism 100 is shown installed and in the activated position in FIG. 10.

Figure 10:
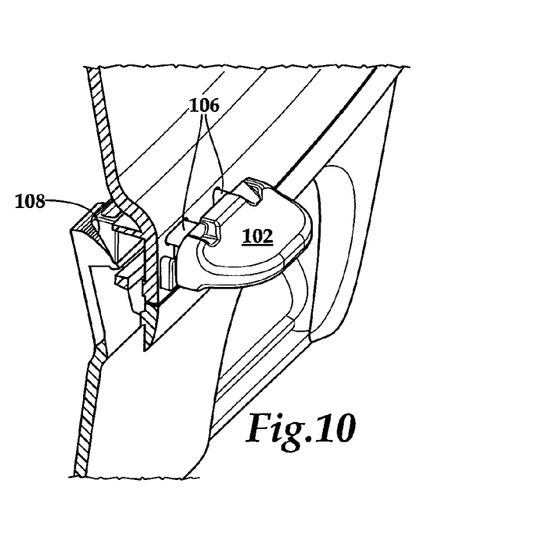
FIG. 10 is an isometric side view, cut away in section, showing the device of FIG. 8 and a portion of the bait station of FIG. 1.

To operate the latch operator mechanism 100, the handle 102 is pressed toward the cover 24 so that the actuation bar 108 presses against the locking fingers 64 deflecting them as shown in FIG. 10 to open the latch. Following the unlatching operation, in a way analogous to that previously described with respect to the key 70, the handle 102 is used to raise the cover of the bait station 20. In assembling the latch operator mechanism 100 the key part 104 can be joined to the handle 102 by small clips 114 which resiliently snap under bars 116 on the handle, permanently joining the prongs 106 of the key part to the handle. A similar latch operator mechanism can be configured based on the alternative embodiment key 118.

It should be noted that the tray contains a cardholder structure opposite landing 54, where a note card for recording the status of the bait station may be retained. It should also be noted that the generally raised edge 61 of the tray 30 has a portion which is further raised to shield the lock mechanism from debris and rodent access.

It should further be understood that the resilient fingers can be mounted to either the cover or the base, but it is preferable that the key enter through the cover so that the key can act as a handle for lifting the cover.

It should be understood that preferably the entire access opening 44 or at least most of it is positioned below the tray 30.

It should be understood that the ballast weight 28 will preferably fill the base 22 substantially flooding, and substantially conforming to the base interior 48 beneath the tray 30 and in between the short interior walls 52, so that a portion of the ballast weight is positioned beneath the tray landing 54.

It should be understood that where bait is described as used within the station, the station will generally contain either mechanical traps or rodenticide, but instead of rodenticide the bait station may simply be used with bait to detect the presence of the targeted species, or the bait may include a fluorescent dye or other additives for tracking the activities of the targeted species.

It should be understood that paper towel dispensers using one or two prong keys which are positioned to actuate resilient prongs and to engage and lift the lid are known in the prior art.

It is understood that the invention is not limited to the particular construction and arrangement of parts herein illustrated and described, but embraces all such modified forms thereof as come within the scope of the following claims.

We claim:

1. A ballasted bait station comprising:
    a base, having a floor;
    a cover hingedly connected to the base and which closes over the base, and is lockable to the base to define an interior volume;
    wherein the base has an upwardly extending side wall, portions of which define at least one rodent access opening;
    a ballast weight of between 3 and 24 pounds having a corresponding volume positioned within the base and within the interior volume, and biasing the floor to engage a support surface, the ballast weight having a center of gravity, and substantially filling the interior volume from the floor up along the side wall to an upper surface of the ballast weight, but so as not to constrict a path from the at least one rodent access opening to the upper surface;
    wherein the center of gravity of the ballast weight is positioned as close to the floor as possible consistent with not constricting the path from the at least one rodent access opening to the upper surface;
    a tray overlying the ballast weight upper surface and retained within the interior volume;

a bait or a rodent trap positioned within the interior volume on the tray, and above the ballast weight; and wherein the at least one rodent access opening allows a rodent to pass into a portion of the interior volume above the upper surface, wherein the bait or the rodent trap is positioned on the tray such that a rodent can access the bait or rodent trap.

2. The ballasted bait station of claim 1 wherein the at least one rodent access opening further comprises at least two rodent access openings.

3. The ballasted bait station of claim 1 wherein the ballast weight weighing between 3 and 24 pounds is at least about 7 pounds.

4. The ballasted bait station of claim 3 wherein the ballast weight weighing between 3 and 24 pounds is between about 7 to 14 pounds.

5. A ballasted bait station comprising:

a base, having a generally flat floor, the base having a peripheral wall extending upwardly from the floor, wherein portions of the peripheral wall define at least two rodent access openings which extend through the peripheral wall, the rodent access openings opening so that a rodent moving over a support surface which supports the base of the bait station can readily enter the bait station;

a cover hingedly connected to the base and which closes over the base, and is lockable to the base to define an interior volume;

a ballast weight of about 7 pounds positioned within the base and within the interior volume, the ballast weight engaging a portion of the floor and extending upwardly along other portions of the peripheral wall a selected distance to an upper surface of the ballast weight, the ballast weight having a center of gravity;

a tray overlying the ballast weight upper surface and retained within the interior volume, the tray arranged so as to support a bait or a rodent trap positioned within the interior volume positioned above the ballast weight;

a path defined between the bait or rodent trap positioned above the ballast weight and each of the rodent access openings, wherein a rodent can proceed from the support surface directly into the interior volume and to the bait or rodent trap positioned above the ballast weight; and wherein the center of gravity of the ballast weight is positioned as close to the floor as possible by filling the base to an extent possible consistent with not constricting the path from each of the two rodent access openings to the bait or rodent trap.

6. The ballasted bait station of claim 5 wherein the cover has two outwardly projecting cover ridges;

wherein the base floor is generally flat but has portions forming two inwardly projecting nesting ridges;

wherein the bait station is interengageable with similar bait stations so as to be stacked, so that the two inwardly projecting nesting ridges of one bait station, engages with the outwardly projecting cover ridges of another bait station.

7. At least two ballasted bait stations each ballasted bait stations, comprising:

a base having a floor which is engaged with a support surface;

a cover hingedly connected to the base and which closes over the base, and is lockable to the base to define an interior volume;

wherein the cover has two outwardly projecting cover ridges;

wherein the base has an upwardly extending side wall, portions of which define at least one rodent access opening;

wherein the base floor is generally flat but has portions forming two inwardly projecting nesting ridges;

a ballast weight of between 3 and 24 pounds positioned within the base and within the interior volume, the ballast weight engaging the floor and biasing the floor to engage the support surface, the ballast weight having a center of gravity, and substantially filling the interior volume from the floor up along the side wall to an upper surface of the ballast weight, but so as not to constrict a path from the at least one rodent access opening to the upper surface;

wherein the two nesting ridges also engage corresponding indentations in a bottom surface of the ballast weight;

a tray overlying the ballast weight upper surface and retained within the interior volume;

a bait or a rodent trap positioned within the interior volume on the tray above the ballast weight; and wherein the at least one rodent access opening is positioned so as to allow a rodent to pass from the support surface into the interior volume and to move within the interior volume to access the bait or rodent trap on the tray;

wherein each of the two bait stations are interengageable with the other to be stacked, so that the two inwardly projecting nesting ridges of one of the bait stations, engage with the outwardly projecting cover ridges on the cover of the other bait station.

8. The ballasted bait stations of claim 7 wherein the ballast weights weighing between 3 and 24 pounds are at least about 7 pounds.

9. The ballasted bait stations of claim 8 wherein the ballast weights are between about 7 to 14 pounds.

\* \* \* \* \*